(12) United States Patent
Kerscher et al.

(10) Patent No.: US 9,855,631 B2
(45) Date of Patent: Jan. 2, 2018

(54) MACHINE TOOL FOR PROCESSING A WORKPIECE AND METHOD FOR OPERATING SUCH A MACHINE TOOL

(71) Applicant: TRUMPF Werkzeugmaschinen GmbH + Co. KG, Ditzingen (DE)

(72) Inventors: Stefan Kerscher, Walzbachtal (DE); Marc Klinkhammer, Ditzingen (DE)

(73) Assignee: TRUMPF Werkzeugmaschinen GmbH + Co. KG, Ditzingen (DE)

( * ) Notice: Subject to any disclaimer, the term of this patent is extended or adjusted under 35 U.S.C. 154(b) by 403 days.

(21) Appl. No.: 14/701,990

(22) Filed: May 1, 2015

(65) Prior Publication Data

US 2015/0314408 A1 Nov. 5, 2015

(30) Foreign Application Priority Data

May 2, 2014 (EP) .................................... 14166860

(51) Int. Cl.
*B23Q 3/155* (2006.01)
*B21D 37/14* (2006.01)
(Continued)

(52) U.S. Cl.
CPC ....... *B23Q 3/15573* (2013.01); *B21D 37/145* (2013.01); *B23Q 3/15503* (2016.11);
(Continued)

(58) Field of Classification Search
CPC ................ B21D 37/145; B21D 37/147; G05B 2219/34347; G05B 2219/50263;
(Continued)

(56) References Cited

U.S. PATENT DOCUMENTS 5,224,915 A * 7/1993 Kilian .................... B21D 28/12
483/1
5,669,866 A 9/1997 Julian et al.
(Continued)

FOREIGN PATENT DOCUMENTS

EP 0927600 B1 10/1998
EP 2198991 A1 6/2010
(Continued)

*Primary Examiner* — Erica E Cadugan
(74) *Attorney, Agent, or Firm* — Fish & Richardson P.C.

(57) ABSTRACT

A machine tool for processing a workpiece comprises a processing station which has a tool receiving member in which a processing tool for processing the workpiece can be introduced and replaced, a tool store which has at least one storage space for a processing tool, a tool handling device which can be moved by a controlled drive into a tool-transfer position, a movement unit which can move the workpiece and the tool store and which can be moved by a controlled drive into any of a setup position, a processing position, and a tool changing position, a control device for the drive of the tool handling device which can define the tool-transfer position of the tool handling device, and a control device for the drive of the movement unit which can define the setup position, the processing position, and the tool changing position of the movement unit.

6 Claims, 3 Drawing Sheets

(51) Int. Cl.
  *B21D 28/00* (2006.01)
  *B21D 43/11* (2006.01)
  *B23Q 7/04* (2006.01)
  *G05B 19/18* (2006.01)
  *B21D 43/00* (2006.01)
  *G05B 19/4093* (2006.01)

(52) U.S. Cl.
  CPC .............. *B23Q 7/046* (2013.01); *B21D 28/00* (2013.01); *B21D 43/003* (2013.01); *B23Q 3/15539* (2016.11); *G05B 19/40938* (2013.01); *G05B 2219/34347* (2013.01); *Y02P 90/265* (2015.11); *Y10T 483/10* (2015.01); *Y10T 483/12* (2015.01); *Y10T 483/127* (2015.01); *Y10T 483/16* (2015.01); *Y10T 483/1731* (2015.01); *Y10T 483/18* (2015.01); *Y10T 483/1855* (2015.01)

(58) Field of Classification Search
  CPC ........... G05B 2219/50264; G05B 2219/50272; Y10T 483/16; Y10T 483/1729; Y10T 483/1731; Y10T 483/127; B23Q 3/155–3/15793
  USPC ........................................... 483/14, 28–29, 6
  See application file for complete search history.

(56) References Cited

U.S. PATENT DOCUMENTS

| | | | |
|---|---|---|---|
| 7,108,647 B2* | 9/2006 | Nakazawa | B23Q 1/66 29/33 P |
| 9,302,305 B2* | 4/2016 | Kerscher | B21D 5/0209 |
| 9,707,652 B2* | 7/2017 | Klinkhammer | B23Q 3/15526 |
| 2002/0151420 A1* | 10/2002 | Scott | B23K 26/10 483/29 |
| 2011/0308362 A1* | 12/2011 | Buettner | B21D 37/14 83/13 |
| 2012/0100974 A1* | 4/2012 | Busch | B21D 37/14 483/1 |
| 2014/0121084 A1* | 5/2014 | Klinkhammer | B21D 37/145 483/1 |

FOREIGN PATENT DOCUMENTS

| | | |
|---|---|---|
| EP | 2692455 A1 | 2/2014 |
| EP | 2724797 A1 | 4/2014 |

* cited by examiner

MACHINE TOOL FOR PROCESSING A WORKPIECE AND METHOD FOR OPERATING SUCH A MACHINE TOOL

CROSS-REFERENCE TO RELATED APPLICATIONS

This application claims priority to European Patent Application No. 14 166 860.8, filed on May 2, 2014. The contents of this priority application are hereby incorporated by reference in their entirety.

TECHNICAL FIELD

The invention relates to a machine tool for processing a workpiece, in particular a metal sheet.

BACKGROUND

Certain prior art such as EP 2 198 991 A1 relates to a machine tool having a C-shaped machine frame, which has an upper frame leg and a lower frame leg. At the free ends of the two frame legs there is provided a processing station which itself includes an upper tool receiving member on the upper frame leg and a lower tool receiving member on the lower frame leg. In a leg intermediate space between the upper frame leg and the lower frame leg, there is provided a coordinate guide with a horizontal transverse rail which extends in the transverse direction of the two frame legs and which can travel in both axial directions of a horizontal movement plane in a motor-driven and numerically controlled manner. A plurality of clamping claws and a plurality of tool retention members are fitted beside each other along the transverse rail of the coordinate guide. The clamping claws serve to releasably fix a metal sheet to the transverse rail. The tool retention members form a tool store which is provided on the transverse rail and which is intended for receiving processing tools. A metal sheet which is fixed to the transverse rail by the clamping claws is positioned for processing purposes by corresponding movements of the transverse rail with respect to the processing station and the processing tools which have been introduced into the tool receiving members of the processing station. Furthermore, the transverse rail travels with respect to the processing station of the machine frame into positions in which, in order to change tools, processing tools are transferred between the tool receiving members of the processing station and the tool store provided on the transverse rail.

Depending on the respective processing task, the tool store on the transverse rail must be provided with processing tools. To this end, the transverse rail is moved on the machine frame of the previously known machine tool into a fixedly predetermined setup position at the rear end of the leg intermediate space between the upper frame leg and the lower frame leg of the machine frame. In this instance, the transverse rail moves into the fixed setup position before or after a workpiece processing operation or also before or after a tool change at the processing station. If the transverse rail is in the setup position, the tool retention members provided on the transverse rail are accessible for a tool handling device which itself is formed by a metal sheet loading and unloading unit of the previously known machine tool. The metal sheet loading and unloading unit transfers processing tools between the tool store on the transverse rail and a stationary tool magazine which is spaced apart from the machine frame of the machine tool. To this end, the metal sheet loading and unloading unit moves into a transfer/receiving position in which it can access the respective tool retention member of the transverse rail.

During the setup of the tool store on the transverse rail, the transverse rail is stationary. The sheet processing operation at the processing station of the machine tool is interrupted and a tool change at the processing station is not possible.

SUMMARY

Certain aspects of the invention relate to a machine tool for processing a workpiece such as a metal sheet. The machine tool can have a processing station which has a tool receiving member in which a processing tool for processing the workpiece can be introduced and replaced. The machine tool can have a tool store which has at least one storage space for a processing tool. The machine tool can have a tool handling device which can be moved by a controlled drive into a transfer/receiving position. The machine tool can have a movement unit by which the workpiece and the tool store can be moved and which can be moved by a controlled drive, on the one hand, into a setup position and, on the other hand, into an operating position in the form of a processing position and/or into an operating position in the form of a tool changing position. The machine tool can have a control device which is provided for the drive of the tool handling device and by which the transfer/receiving position of the tool handling device can be defined, and the machine tool can have a control device which is provided for the drive of the movement unit and by which, on the one hand, the setup position and, on the other hand, the processing position and/or the tool changing position of the movement unit can be defined. With the movement unit in the setup position, the storage space of the tool store can be moved by the movement unit into a position in which, with the tool handling device in a simultaneous transfer/receiving position, a processing tool can be supplied to the storage space of the tool store and/or can be removed from the storage space of the tool store by the tool handling device. With the movement unit in the processing position, the workpiece which is movingly connected to the movement unit can be moved by the movement unit into a position in which the workpiece can be processed at a location by the processing tool which has been introduced into the tool receiving member of the processing station. With the movement unit in the tool changing position, the tool store which is movingly connected to the movement unit can be moved by the movement unit into a position in which a processing tool can be transferred from the storage space of the tool store to the tool receiving member of the processing station or a processing tool can be transferred from the tool receiving member of the processing station to the storage space of the tool store.

Other aspects of the invention relate to a method for operating a machine tool for processing a workpiece such as a metal sheet, wherein the machine tool has a processing station having a tool receiving member in which a processing tool for processing the workpiece can be introduced and replaced, a tool store having at least one storage space for a processing tool, a tool handling device having a drive which is controlled by a control device, and a movement unit which is movingly connected to the workpiece and to the tool store and which has a drive which is controlled by a control device. For setting up the tool store, the movement unit can be moved into a setup position which is defined by the control device of the drive of the movement unit and the tool handling device can be moved into a transfer/receiving position defined by the control device of the drive of the tool handling device With the movement unit in the setup position and with the tool handling device in a simultaneous transfer/receiving position, a processing tool can be supplied to the storage space of the tool store and/or can be removed from the storage space of the tool store by the tool handling device. The movement unit can be moved into an operating position defined by the control device of the drive of the movement unit, the operating position being in the form of a processing position, and the workpiece which is movingly connected to the movement unit is thereby moved into a position in which the workpiece can be processed at a location by the processing tool which has been introduced into the tool receiving member of the processing station, and/or the movement unit can be moved into an operating position defined by the control device of the drive of the movement unit, the operating position being in the form of a tool changing position, and the tool store which is movingly connected to the movement unit is thereby moved into a position in which at the processing station a processing tool can be transferred from the storage space of the tool store to the tool receiving member of the processing station or a processing tool can be transferred from the tool receiving member of the processing station to the storage space of the tool store.

The invention further relates to a processing program for operating a machine tool of the above type, a method for producing such a processing program and a computer program product with encoding means for carrying out all the steps of the latter method.

Systems and methods described herein can provide an improved integration of the setup of a tool store provided on a movement unit of a machine tool into the overall process sequence on the machine tool.

The setup position of the movement unit and the transfer/receiving position of the tool handling device, which position is adapted thereto, can be defined in a variable manner. In this instance, the setup position of the movement unit is predetermined in accordance with the position(s) which the movement unit assumes before and/or after the setup operation. During the configuration of the setup operation on the tool store of the movement unit, the processes which are carried out on the machine tool before and/or after the setup operation are taken into account. The entire process sequence on the machine tool is thereby optimized. Setup positions which may be considered for the movement unit include those positions which can be associated with a transfer/receiving position of the tool handling device.

In order to carry out certain methods described herein, a processing program is carried out on a numerical machine control unit of the machine tool. This processing program includes control commands for the drive of the movement unit and control commands for the drive of the tool handling device. The control commands are produced in the context of the method for producing the processing program. In order to carry out the steps of the latter method, a computer program product with corresponding encoding means is used. This computer program product forms a component of a computer-based programming system which in turn enables the user to generate the control commands of the processing program.

In the interest of the high efficiency of the machine tool, the proportion of the operating time of the machine tool which cannot be used for the workpiece processing operation can be minimized.

To this end, in some embodiments, there is provision for the control device of the drive of the movement unit to define the setup position of the movement unit in such a manner that the movement of the movement unit between the setup position and the operating position which is assumed by the movement unit before the setup position and/or after the setup position can be carried out as rapidly as possible or over the shortest possible distance, e.g., minimize the distance. Ideally, the operating position of the movement unit is the setup position of the movement unit. In this instance, it is possible to set up the tool store which is movingly connected to the movement unit in parallel with productive time. If the setup position of the movement unit and the operating position of the movement unit before or after the setup position are different from each other and if rapid machine axes are used to drive the movement unit, the non-productive time which is connected with the movement of the movement unit into the setup position and/or the operating position which precedes the setup operation and/or the operating position which follows the setup operation is minimized.

So that the setup operation itself also takes up very little time there is provision for the tool handling device to be located in the transfer/receiving position at the latest when the movement unit reaches the setup position. For the transfer of the tool handling device into the transfer/receiving position, until the movement unit reaches the setup position a relatively large amount of time is available, for example, a period of time in which a workpiece is processed or a processing tool at the processing station of the machine tool is changed. If this period of time is sufficiently long, drives having relatively low power and consequently in particular cost-effective drives are sufficient for the tool handling device.

In some embodiments, there is provided as a movement unit a guide carrier of a guide device (e.g., a coordinate guide) which is arranged in a leg intermediate space between an upper frame leg and a lower frame leg of a machine frame of the machine tool, which lower frame leg extends in the same direction as the upper frame leg. The machine frame may accordingly be, for example, C-shaped, or constructed in an O-shaped manner. The guide carrier extends in the transverse direction of the upper and the lower frame legs and can be moved relative to the two frame legs. The workpiece to be processed is fixed to the guide carrier, for example, by clamping claws. The tool store on the guide carrier may be formed by one or more tool retention members, which are fitted along the guide carrier and which accordingly form a linear magazine. It is possible to use, for example, a punching station or a bending station as a processing station of the machine tool and punching tools or bending tools may accordingly be provided as processing tools.

For the tool handling device, different construction types are also conceivable. A tool handling device, in some cases, can be positioned by the associated drive in the longitudinal direction of the upper frame leg and the lower frame leg into the transfer/receiving position. For example, tool grippers can be used as a tool handling device.

In some embodiments, the tool handling device supplies to the tool store on the movement unit processing tools from a tool store which is remote from the processing station. Accordingly, the tool handling device allows processing tools which are removed from the tool store of the movement unit to be transferred to the tool store remote from the processing station. Tool stores which are remote from the processing station may include, for example, tool stores which are mounted on the machine frame of the machine tool. However, tool stores which are arranged in a manner detached from the machine frame of the machine tool are also conceivable. The tool store which is remote from the processing station can where applicable also be set up in accordance with the tool requirement on the machine tool.

In certain embodiments there is provision for the tool receiving member of the processing station to be able to be positioned relative to the movement unit. As a result of the movability thereof, the tool receiving member is, for example, capable of carrying out processing movements relative to the workpiece which is fixed to the movement unit. Furthermore, the tool receiving member which, in order to prepare a tool change, can be positioned relative to the movement unit can be moved towards the tool store which can be moved by the movement unit.

Other aspects, embodiments, and advantages are described below with reference to exemplary schematic illustrations.

DETAILED DESCRIPTION

Figure 1:
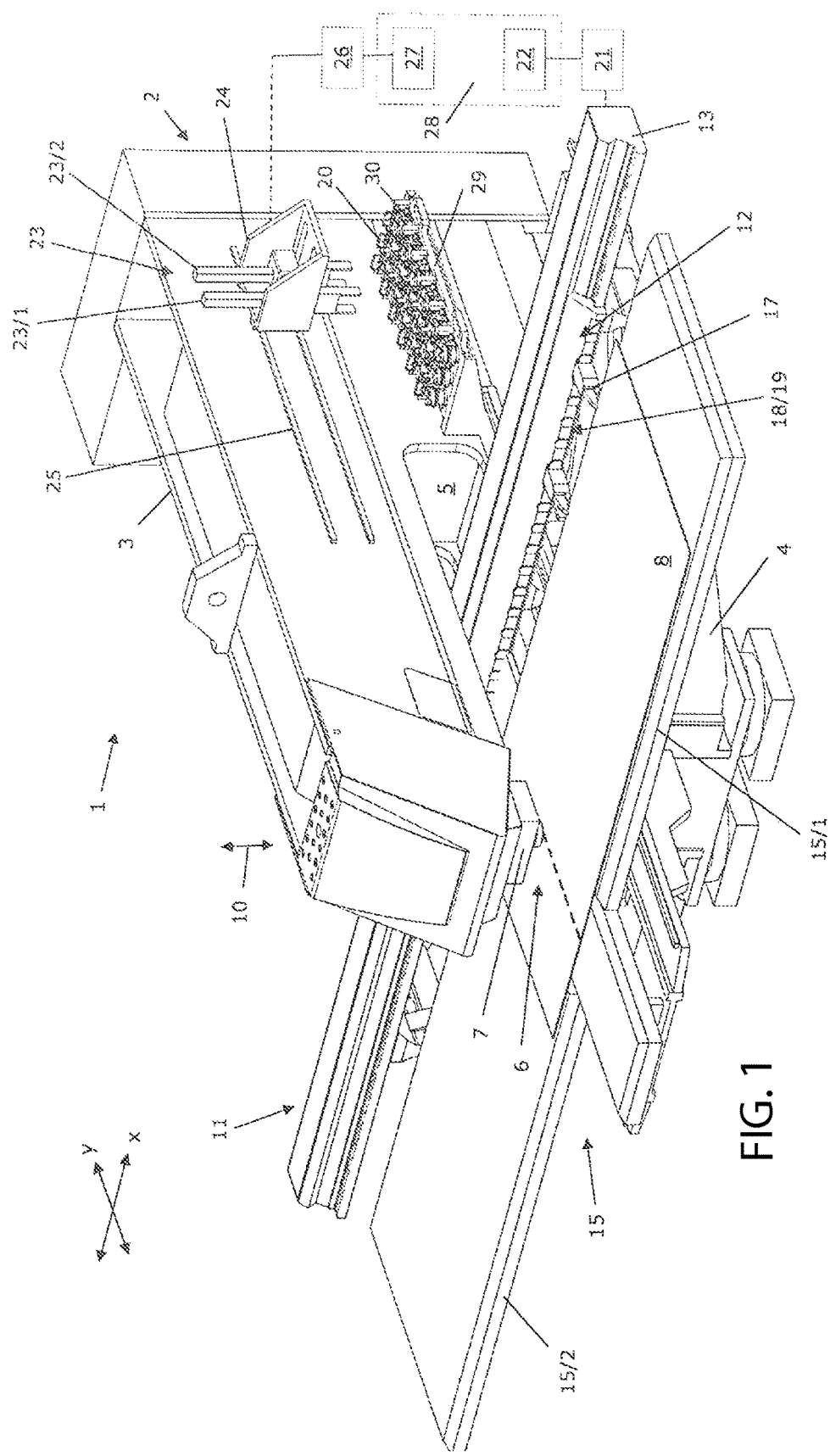
FIG. 1 shows a machine tool for punching sheet metal having a coordinate guide with a carrier rail that is provided as a movement unit.
Figure 2:
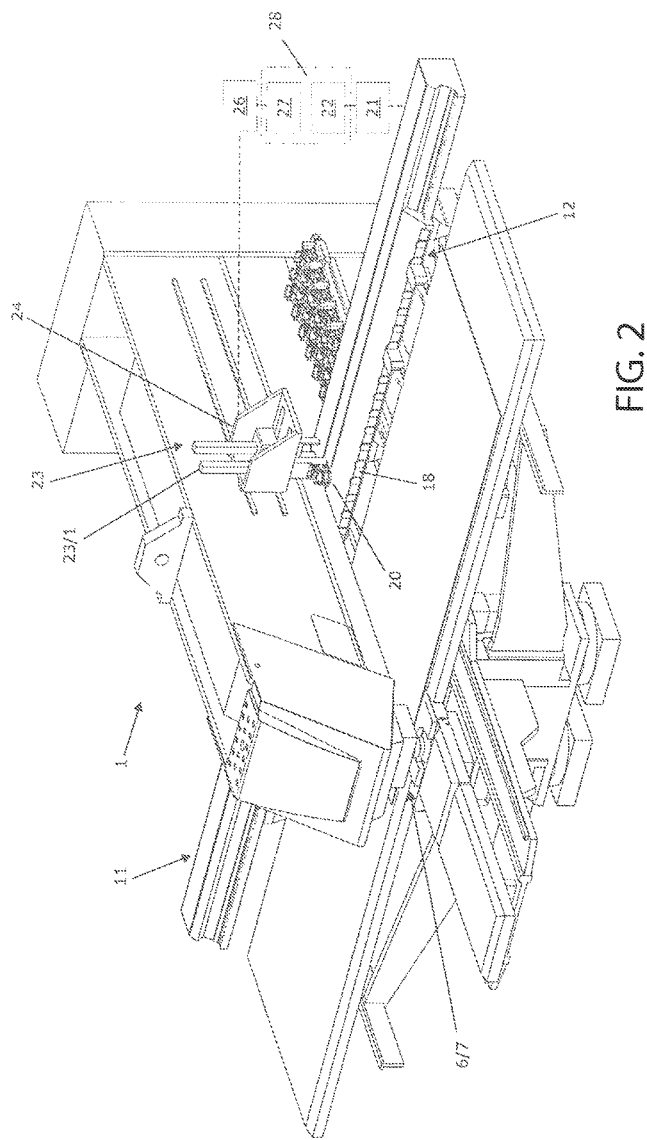
FIG. 2 shows the machine tool of FIG. 1 with the carrier rail of the coordinate guide in a processing and setup position.
Figure 3:
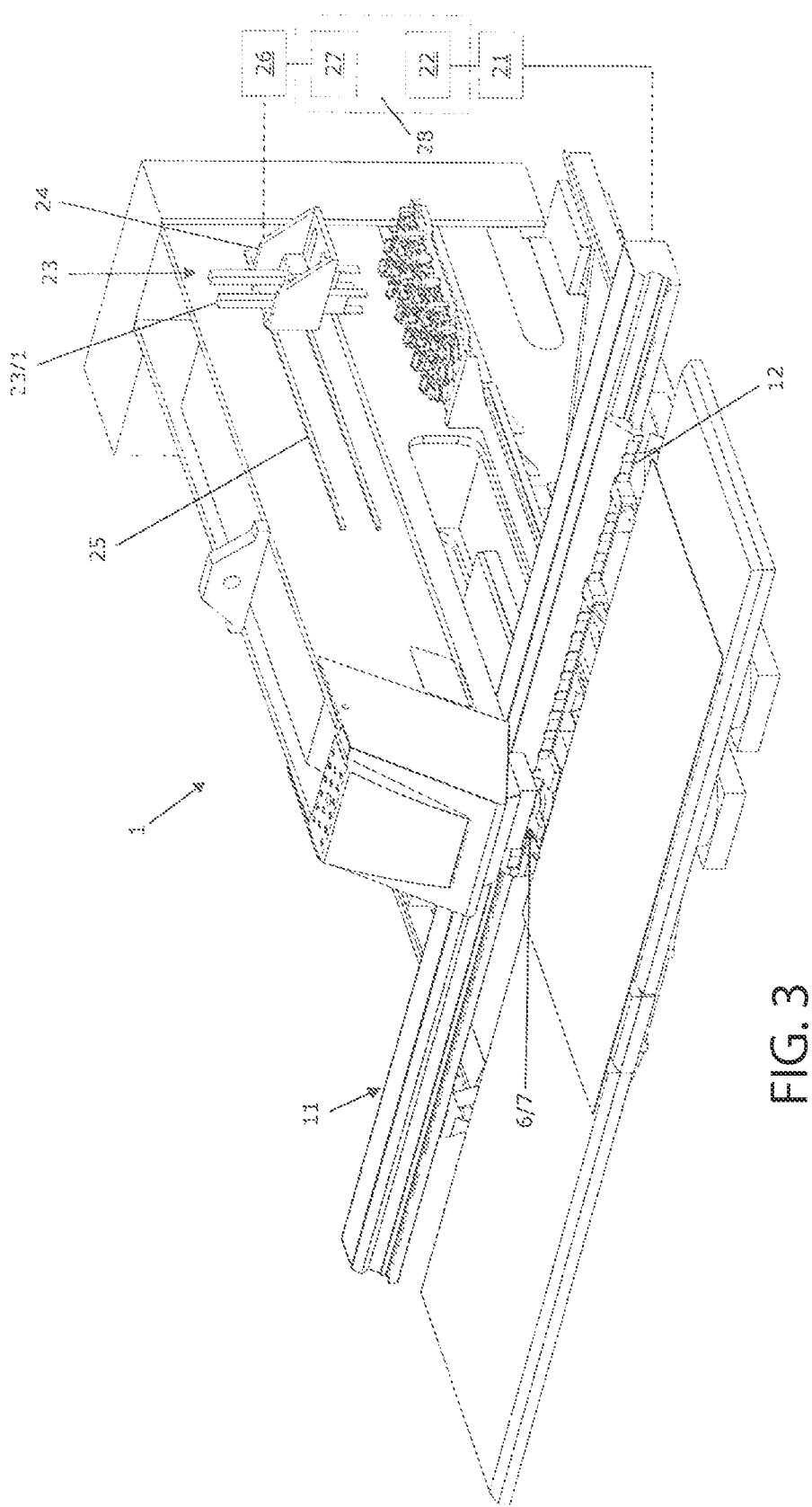
FIG. 3 shows the machine tool of FIGS. 1 and 2 during the tool change on a tool receiving member of the machine tool.

As shown in FIGS. 1 to 3, a machine tool which is constructed as a punching machine 1 has a C-shaped machine frame 2 having an upper frame leg 3, a lower frame leg 4 and a leg intermediate space 5 which is provided between the upper frame leg 3 and the lower frame leg 4.

At the free ends of the upper frame leg 3 and the lower frame leg 4, there is a processing station in the form of a punching station 6. In the conventional manner, a punching tool which cannot be seen in detail in FIG. 1 is introduced into a tool receiving member 7 of the punching station 6 as a processing tool. The tool receiving member 7 includes an upper tool receiving member which is provided on the upper frame leg 3 of the machine frame 2 and a lower tool receiving member on the lower frame leg 4 of the machine frame 2.

For punching a metal sheet 8, an upper punching die which is introduced into the upper tool receiving member cooperates in conventional manner with a lower punching die which is introduced into the lower tool receiving member which is concealed in FIG. 1 by the metal sheet 8. Using a numerically controlled lifting drive, the upper punching die can be raised and lowered in the direction of a double-headed arrow 10 and can thereby be moved relative to the lower punching die. In addition to the upper punching die and the lower punching die, the punching tool which has been introduced into the tool receiving member 7 of the punching station 6 conventionally includes a stripper.

The leg intermediate space 5 between the upper frame leg 3 and the lower frame leg 4 receives a guiding device which is constructed as a coordinate guide 11 of conventional construction type.

The coordinate guide 11 includes as a movement unit a guide carrier in the form of a carrier rail 12, which is movably guided in a longitudinal direction on a base carrier 13 of the coordinate guide 11. There is fitted to the base carrier 13 a two-part workpiece table 15 comprising table halves 15/1, 15/2. The two table halves 15/1, 15/2 are separated from each other by an intermediate space, inside which the lower tool receiving member is arranged.

Clamping claws 17 and furthermore storage spaces 18 of a tool store 19 are provided on the carrier rail 12. The clamping claws 17 serve to releasably fix a metal sheet 8 to the carrier rail 12. The storage spaces 18 of the tool store 19 receive as processing tools punching tools 20, as can be used in place of the punching tool which is introduced into the tool receiving member 7 of the punching station 6. A punching tool 20 travelling to one of the storage spaces 18 is illustrated in FIG. 2. A plurality of storage spaces 18 for punching tools 20 are provided along the carrier rail 12. The tool store 19 is consequently constructed as a so-called linear magazine. For reasons of clarity, FIG. 1 only shows empty storage spaces 18. The storage spaces 18 on the carrier rail 12 are typically almost completely occupied with punching tools 20.

The base carrier 13 of the coordinate guide 11 extends with the longitudinal direction thereof in a first axial direction (x axis) and is movably guided in a second axial direction (y axis) on the lower frame leg 4. The x axis and the y axis define a horizontal movement plane.

A motorized drive 21 indicated in FIG. 1 serves to produce movements of the base carrier 13 of the coordinate guide 11 along the lower frame leg 4 of the machine frame 2 (y direction) and movements of the carrier rail 12 along the base carrier 13 (x direction). The motorized drive 21 is controlled by a numerical control device 22.

The workpiece table 15, the tool store 19 with the storage spaces 18, the clamping claws 17 and where applicable a metal sheet 8 which is retained by the clamping claws 17 move together with the base carrier 13 in the y direction. Together with the carrier rail 12, the tool store 19 with the storage spaces 18, the clamping claws 17 and where applicable the metal sheet 8 can be moved relative to the base carrier 13 along the x axis.

Above the coordinate guide 11, there is mounted on the upper frame leg 3 of the machine frame 2 a dual gripper 23 having tool handling devices in the form of two gripper units 23/1, 23/2. The gripper units 23/1, 23/2 are supported on a carrier structure 24.

Together with the carrier structure 24, the gripper units 23/1, 23/2 can be moved on a longitudinal guide 25 for the carrier structure 24 in the y direction and consequently in the longitudinal direction of the upper frame leg 3. In addition, each of the gripper units 23/1, 23/2 can be positioned relative to the carrier structure 24 in the x direction and consequently in the transverse direction of the upper frame leg 3.

A motorized drive 26 having a numerical control device 27 is used to produce the movements of the gripper units 23/1, 23/2 of the dual gripper 23 along the x axis and along the y axis. The numerical control device 27 of the motorized drive 26 of the gripper units 23/1, 23/2 as well as the numerical control device 22 of the motorized drive 21 of the carrier rail 12 is integrated into a numerical machine control unit 28 of the punching machine 1.

Using the numerical machine control unit 28, a numerical processing program for operating the punching machine 1 is implemented. The numerical processing program is produced by a programming system. A component of the programming system is a computer program product for producing the individual control commands of the numerical processing program.

The gripper units 23/1, 23/2 of the dual gripper 23 can access both the storage spaces 18 of the tool store 19 on the carrier rail 12 of the coordinate guide 11 and a tool tray 29 which is fitted to the rear end of the machine frame 2 and which has a plurality of storage spaces 30 for punching tools 20. The tool tray 29 forms a tool store which is remote from the processing station and the tool store 19 on the carrier rail 12 is, compared with the tool tray 29, arranged close to the processing station.

FIG. 1 shows the machine tool 1 during the processing of the metal sheet 8 using the punching tool which is introduced into the tool receiving member 7 of the punching station 6. The metal sheet 8 to be processed is fixed to the carrier rail 12 by the clamping claws 17 and is positioned in order to produce the desired punching by corresponding movements of the carrier rail 12 with respect to the punching tool of the punching station 6. In the y direction, the carrier rail 12 is moved using the base carrier 13. Movements in the x direction are carried out where applicable by the carrier rail 12 along the base carrier 13. The cutting line of the punching which is intended to be produced in the present example on the metal sheet 8 is indicated in FIG. 1 with dashed lines. Accordingly, the punching which is intended to be produced extends in the y direction from the inner side of the metal sheet 8 to the metal sheet edge at the front in FIG. 1.

During the metal sheet processing operation, the gripper unit 23/1 of the dual gripper 23 moves along the upper frame leg 3—and where required—also in the transverse direction of the upper frame leg 3 into a position in which the gripper unit 23/1 is already arranged above a punching tool 20 on the tool tray 29 that is intended to be transferred to a specific storage space 18 of the tool store 19 on the carrier rail 12 after the current metal sheet processing operation has been completed. During the same metal sheet processing operation, the gripper unit 23/1 is also lowered to the relevant punching tool 20 on the tool tray 29. After the gripper unit 23/1 has received the punching tool 20, the controlled motorized drive 26 moves the gripper unit 23/1 in the direction towards the punching station 6 into a transfer/receiving, or tool-transfer position. In place of the gripper unit 23/1, the gripper unit 23/2 of the dual gripper 23 could also be used.

The transfer/receiving position of the gripper unit 23/1 is defined by the numerical control device 27 of the motorized drive 26 of the gripper unit 23/1 in accordance with a setup position of the carrier rail 12. The setup position of the carrier rail 12 is in turn predetermined by the numerical control device 22 of the motorized drive 21 of the carrier rail 12 in accordance with a processing position of the carrier rail 12. This processing position of the carrier rail 12 is the position which the carrier rail 12 assumes at the time at which the punching tool at the punching station 6 carries out the final punching stroke of the current processing operation. As the setup position of the carrier rail 12, the position is defined which can be reached by the carrier rail 12 over the shortest path starting from the processing position and in which the storage space 18 on the carrier rail 12, for which the punching tool 20 which is retained on the gripper unit 23/1 is intended, is accessible for the gripper unit 23/1.

In the present example, the relationships are such that the processing position of the carrier rail 12 at the time of the final punching stroke of the current processing operation directly represents the setup position of the carrier rail 12. The storage space 18 of the carrier rail 12 which is intended to be equipped accordingly assumes already at the time of the final punching stroke of the current processing operation a position in which it is accessible for the gripper unit 23/1 which has previously been moved into a corresponding transfer/receiving position. The carrier rail 12 in the setup position and the gripper unit 23/1 in the transfer/receiving position are shown in FIG. 2.

If the carrier rail 12 is in the setup position and the gripper unit 23/1 is moved into the transfer/receiving position, the gripper unit 23/1 is located with the punching tool 20 which is retained thereon opposite the storage space 18 of the carrier rail 12 which is intended to be equipped in a vertical direction. Now only a lowering movement of the gripper unit 23/1 is required in order to transfer the punching tool 20 to the storage space 18 of the tool store 19 which is provided for this purpose on the carrier rail 12.

The transfer of the punching tool 20 from the gripper unit 23/1 to the respective storage space 18 of the carrier rail 12 can be carried out simultaneously with the subsequent punching stroke of the current processing operation and consequently within the productive time or directly following the final punching stroke of the current processing operation. An interruption of the process sequence owing to the setup of the relevant storage space 18 can thereby be prevented. At least the time which is required for the setup of the relevant storage space 18 on the carrier rail 12 and which as non-productive time cannot be used for the metal sheet processing operation is minimized.

Alternatively or in addition to the adaptation of the transfer/receiving position of the gripper unit 23/1 or the gripper unit 23/2 to a processing position of the carrier rail 12 before a setup position is reached, the transfer/receiving position of the gripper unit 23/1 can be defined in accordance with a tool change position which the carrier rail 12 assumes before moving into a setup position.

The situation during a tool change at the punching station 6 is illustrated in FIG. 3.

By corresponding movements of the carrier rail 12 with respect to the tool receiving member 7 of the punching station 6, the punching tool 20 which has been introduced at the punching station 6 is first transferred to a storage space 18 of the tool store 19 on the carrier rail 12. Subsequently, the carrier rail 12 is moved relative to the tool receiving member 7 in such a manner that the punching tool 20 which is intended to be used in place of the original punching tool 20 at the punching station 6 can be transferred to the tool receiving member 7. At the time at which the punching tool 20 which is provided in place of the original punching tool 20 is introduced into the tool receiving member 7 of the punching station 6, the carrier rail 12 assumes the tool changing position to which the setup position of the carrier rail 12 and the transfer/receiving position of the gripper unit 23/1 or the gripper unit 23/2 of the dual gripper 23 are adapted.

Taking into account the tool changing position of the carrier rail 12, the numerical control device 22 of the motorized drive 21 of the carrier rail 12 defines as the setup position of the carrier rail 12 the position of the carrier rail 12 at which a storage space 18 of the carrier rail 12 to be equipped is accessible for the gripper unit 23/1 or the gripper unit 23/2 and which can be reached by the carrier rail 12 over the shortest possible path starting from the tool change position. In a manner matching to the setup position of the carrier rail 12 defined in this manner, the numerical control device 27 of the motorized drive 26 of the dual gripper 23 determines the transfer/receiving position of the respective gripper unit 23/1, 23/2.

The respective gripper unit 23/1, 23/2 is already moved with the punching tool 20 to be transferred to the carrier rail 12 into the previously defined transfer/receiving position during the tool change at the punching station 6. If the carrier rail 12 moves into the setup position after the tool change is completed, it is already anticipated by the gripper unit 23/1, 23/2 which is moved into the transfer/receiving position and the tool transfer to the storage space 18 of the carrier rail 12 which is intended to be equipped can be carried out directly after the carrier rail 12 has reached the setup position.

In a modification of the operations described above, it is conceivable for the setup position of the carrier rail 12 and the transfer/receiving position of the gripper units 23/1, 23/2 of the dual gripper 23 to be defined in accordance with a processing position of the carrier rail 12, into which position the carrier rail 12 is moved starting from a setup position. In this instance, the processing position of the carrier rail 12 must be taken into account by the numerical control device 22 of the motorized drive 21 is the position which the carrier rail 12 assumes at the time of the first punching stroke of the metal sheet processing operation which then follows.

It is also possible to define the setup position of the carrier rail 12 and the transfer/receiving position of the gripper units 23/1, 23/2 of the dual gripper 23 in accordance with a tool change position into which the carrier rail 12 moves starting from the setup position. The tool change position of the carrier rail 12 is in this instance the position of the carrier rail 12 starting from which the tool change is carried out by a corresponding travel movement of the carrier rail 12.

Regardless of whether the tool change position of the carrier rail 12 is approached before or after a setup position of the carrier rail 12, it is possible to shorten the travel path of the carrier rail 12 between the setup position and the tool change position if the tool receiving member 7 can move relative to the machine frame 2 of the punching machine 1 in the y direction. This is the case, for example, on machines on which the tool receiving member 7 can carry out for processing purposes highly dynamic short movements relative to the workpiece to be processed which is otherwise positioned by a coordinate guide with respect to the processing tool which is introduced at the tool receiving member 7. Such a movability of the tool receiving member 7 can be used to move the location of the tool change towards the dual gripper 23 and the transfer/receiving positions into which the gripper units 23/1, 23/2 thereof can move.

A number of embodiments of the invention have been described. Nevertheless, it will be understood that various modifications may be made without departing from the spirit and scope of the invention. Accordingly, other embodiments are within the scope of the following claims.

What is claimed is:

1. A machine tool for processing a workpiece, the machine tool comprising:
   a processing station which has a tool receiving member, in which tool receiving member a processing tool for processing the workpiece can be introduced and replaced,
   a tool store which has at least one storage space for a processing tool,
   a tool handling device which can be moved by a controlled drive into a tool-transfer position,
   a movement unit which can move the workpiece and the tool store and which can be moved by a controlled drive into any of a setup position, a processing position, and a tool changing position,
   a control device for the drive of the tool handling device, which control device can define the tool-transfer position of the tool handling device, and
   a control device for the drive of the movement unit, which control device for the drive of the movement unit can define the setup position, the processing position, and the tool changing position of the movement unit, wherein
   when the movement unit is in the setup position and the tool handling device is in the tool-transfer position, a processing tool can be supplied to or removed from the at least one storage space of the tool store via the tool handling device,
   when the movement unit is in the processing position, the workpiece can be processed by a processing tool introduced into the tool receiving member of the processing station, and
   when the movement unit is in the tool changing position, a processing tool can be transferred from the at least one storage space of the tool store to the tool receiving member of the processing station, or a processing tool can be transferred from the tool receiving member of the processing station to the at least one storage space of the tool store,
   and wherein
   the control device of the drive of the movement unit is configured to define the setup position of the movement unit in a variable manner, and the control device of the drive of the tool handling device is configured to define the tool-transfer position of the tool handling device in a variable manner by
   the control device of the drive of the movement unit being configured to define the setup position of the movement unit
   as being at the processing position of the movement unit or, when the setup position is not located at the processing position, in such a manner that the time required for the movement of the movement unit between the setup position of the movement unit and the processing position is minimized, or in such a manner that the amount of the movement of the movement unit between the setup position of the movement unit and the processing position is minimized, or
   as being at the tool changing position of the movement unit or, when the setup position is not located at the tool changing position, in such a manner that the time required for the movement of the movement unit between the setup position of the movement unit and the tool changing position is minimized, or in such a manner that the amount of movement of the movement unit between the setup position of the movement unit and the tool changing position is minimized,
   and by
   the control device of the drive of the tool handling device being configured to define the tool-transfer position of the tool handling device in accordance with the setup position of the movement unit defined by the control device of the drive of the movement unit.

2. The machine tool according to claim 1, wherein the controlled drive of the tool handling device is configured to move the tool handing device into the tool-transfer position, the tool transfer position defined in accordance with the setup position of the movement unit, at the latest when the movement unit has been moved by the controlled drive of the movement unit into the setup position.

3. The machine tool according to claim 1, wherein the movement unit is constructed as a guide carrier of a guide device, which guide device is arranged in a leg intermediate space between an upper frame leg and a lower frame leg of a machine frame of the machine tool, which lower frame leg has a longitudinal axis that extends in the same direction as a direction of extension of a longitudinal axis of the upper frame leg, the tool receiving member of the processing station being provided on the upper frame leg and/or on the lower frame leg, and the guide carrier having a longitudinal axis extending in a direction that is transverse relative to the direction of the longitudinal axis of the upper frame leg and relative to the direction of the longitudinal axis of the lower frame leg, and the guide carrier being able to be moved relative to the upper frame leg and the lower frame leg, and the workpiece can be fixed to the guide carrier, and the tool store being provided on the guide carrier.

4. The machine tool according to claim 3, wherein the controlled drive of the tool handling device is configured to move the tool handling device into the tool-transfer position by moving the tool handling device in the longitudinal direction of the upper frame leg and of the lower frame leg.

5. The machine tool according to claim 2, wherein the tool store is a first tool store and is close to the processing station, and the machine tool further comprising a second tool store which is re-mote from the processing station, and wherein the tool handling device is configured to pick up processing tools to be supplied to the first tool store from the second tool store, and/or the tool handling device is configured to transfer to the second tool store processing tools which have been removed from the first tool store.

6. The machine tool according to claim 1, wherein the tool receiving member of the processing station can be moved relative to the movement unit.

* * * * *

UNITED STATES PATENT AND TRADEMARK OFFICE
CERTIFICATE OF CORRECTION

PATENT NO. : 9,855,631 B2  
APPLICATION NO. : 14/701990  
DATED : January 2, 2018  
INVENTOR(S) : Stefan Kerscher and Marc Klinkhammer Page 1 of 1

It is certified that error appears in the above-identified patent and that said Letters Patent is hereby corrected as shown below:

In the Claims

Column 11  
Line 16, in Claim 5, delete "claim 2," and insert -- claim 1, --  
Line 19, in Claim 5, delete "re-mote" and insert -- remote --

Signed and Sealed this  
Tenth Day of April, 2018

Andrei Iancu  
*Director of the United States Patent and Trademark Office*